United States Patent
Clift et al.

(10) Patent No.: US 11,662,097 B2
(45) Date of Patent: May 30, 2023

(54) JET ENGINE WITH TOROIDAL AIR STREAM COMBUSTION

(71) Applicant: Venture Aerospace, LLC, Centennial, CO (US)

(72) Inventors: Vaughan Lennox Clift, Centennial, CO (US); Sasha Mela, Centennial, CO (US)

(73) Assignee: Venture Aerospace, LLC, Centennial, CO (US)

( * ) Notice: Subject to any disclaimer, the term of this patent is extended or adjusted under 35 U.S.C. 154(b) by 0 days.

(21) Appl. No.: 17/499,339

(22) Filed: Oct. 12, 2021

(65) Prior Publication Data

US 2022/0113029 A1    Apr. 14, 2022

Related U.S. Application Data

(60) Provisional application No. 63/091,230, filed on Oct. 13, 2020.

(51) Int. Cl.
| | |
|---|---|
| *F23R 3/52* | (2006.01) |
| *F23R 3/26* | (2006.01) |
| *F23R 3/04* | (2006.01) |
| *F23R 3/28* | (2006.01) |
| *B29C 44/12* | (2006.01) |
| *B29C 70/48* | (2006.01) |
| *B29K 75/00* | (2006.01) |
| *B29K 105/08* | (2006.01) |
| *B29K 705/02* | (2006.01) |
| *B29L 31/30* | (2006.01) |
| *B29K 307/04* | (2006.01) |

(Continued)

(52) U.S. Cl.
CPC .................. *F23R 3/52* (2013.01); *F23R 3/04* (2013.01); *F23R 3/26* (2013.01); *F23R 3/286* (2013.01); *B29C 44/1209* (2013.01); *B29C 44/1285* (2013.01); *B29C 70/48* (2013.01); *B29K 2063/00* (2013.01); *B29K 2075/00* (2013.01); *B29K 2105/04* (2013.01); *B29K 2105/08* (2013.01); *B29K 2307/04* (2013.01); *B29K 2705/02* (2013.01); *B29L 2031/3076* (2013.01)

(58) Field of Classification Search
CPC ...... F23R 3/00; F23R 3/04; F23R 3/16; F23R 3/26; F23R 3/286; F23R 3/52
See application file for complete search history.

(56) References Cited

U.S. PATENT DOCUMENTS

| | | | |
|---|---|---|---|
| 3,498,055 A | | 3/1970 | Faitani |
| 3,927,958 A | * | 12/1975 | Quinn .................... F02C 3/34 60/39.52 |

(Continued)

OTHER PUBLICATIONS

International Searching Authority, International Search and Written Opinion, dated Jan. 19, 2022 in PCT/US 2021/054573.

(Continued)

*Primary Examiner* — William H Rodriguez
(74) *Attorney, Agent, or Firm* — Critical Path IP Law, LLC

(57) ABSTRACT

An electrically decoupled jet engine. The electrically decoupled jet engine includes a combustion chamber which creates a toroidal flow of air and a rotational electric motor which drives a fuel supply into the combustion chamber. The toroidal flow of air is mixed with the fuel and combusted in the combustion chamber to create thrust.

20 Claims, 6 Drawing Sheets

(51) Int. Cl.
  *B29K 105/04* (2006.01)
  *B29K 63/00* (2006.01)

(56) References Cited

U.S. PATENT DOCUMENTS

| | | | |
|---|---|---|---|
| 3,958,413 A * | 5/1976 | Cornelius | F23R 3/14 |
| | | | 60/39.23 |
| 3,958,416 A * | 5/1976 | Hammond, Jr. | F23R 3/34 |
| | | | 60/39.23 |
| 3,982,392 A * | 9/1976 | Crow | F23R 3/007 |
| | | | 60/39.23 |
| 8,250,854 B2 | 8/2012 | Sharpe | |
| 8,720,205 B2 | 5/2014 | Lugg | |
| 9,021,784 B1 | 5/2015 | Sharpe | |
| 9,752,511 B2 | 9/2017 | McCune | |
| 2012/0017563 A1 | 1/2012 | Aguilar | |
| 2018/0356093 A1* | 12/2018 | Pal | F23R 7/00 |
| 2019/0315461 A1 | 10/2019 | Clift | |

OTHER PUBLICATIONS

Optimal Reynolds Number for liquid-liquid mixing in helical pipes, by Mansour et al, Chemical Engineering Science, vol. 214, Mar. 16, 2020.

* cited by examiner

JET ENGINE WITH TOROIDAL AIR STREAM COMBUSTION

CROSS-REFERENCE TO RELATED APPLICATION

This application is a nonprovisional patent application of and claims the benefit of U.S. Provisional Patent Application No. 63/091,230 titled "Aerospace Propulsion Technologies and Applications" filed Oct. 13, 2020, the disclosure of which is hereby incorporated herein by reference in entirety.

FIELD

The disclosure relates generally to an electrically decoupled jet engine, and more specifically to an electrically decoupled jet engine with a toroidal flow combustion chamber.

BACKGROUND

Traditional jet engines use a centrifugal or coaxial compressor directly driven by a shaft, the shaft itself directly driven by a turbine. The turbine is driven by the fast moving thrust exiting a combustion chamber. This thrust passes through a deflecting "stator" blade onto a collecting "rotor" blade attached to the periphery of a turbine disk. This configuration does differ from other turbo compressors as the goal is to allow the majority of the fast moving gasses to exit the rear of the engine without impedance and create thrust.

The shaft is located central to the combustion chamber(s), the combustion chambers being placed radially around the shaft or in an annular configuration. As such, the shaft and bearing systems are subject to tremendous heat and vibrations. In addition, all components must be extremely well balanced and are subject to significant centrifugal forces.

The conversion of thrust to angular velocity of the turbine is inefficient unless the turbine is rotating at an extremely high RPM. Conversely, the conversion of angular motion of the compressor to compression of the intake air into the combustion chamber is less efficient due to high RPM. One variant on this design is where a portion of the intake air driven by the compressor is allowed to go around the combustion chamber, a so called by pass engine.

One solution is to put a gearing system into the shaft to allow the compressor to be at a slower RPM than the turbine. In one example, the compressor travels at half the RPM of the turbine and this improved fuel efficiency by 15%. McCune, e.g., U.S. Pat. No. 9,752,511 ("McCune") modifies a straight shaft with a gearing system to permit the turbine and compressor to operate at different rotational speeds while still directly driven. The design is reported to have improved efficiency by as much as 15%. However, this design is limited in that increasing and decreasing thrust still requires the shaft driven compressor and turbine to spin up or spin down in response to increased or decreased thrust from the combustion chamber and is subject to significant inertia. It is also somewhat constrained by the air-fuel ratio entering the combustion chamber in that as fuel is increased, there is a period where the fuel mixture is rich until the compressor spins up and additional air flows into the combustion chamber. It is therefore possible to flood the engine with fuel and potentially cause the engine to fail or flame out, limiting the rate at which thrust can be increased. McCune is incorporated by reference for all purposes.

The force (thrust) produced by a turbo jet engine is directly related to the RPM and the RPM is directly related to the thrust exiting the combustion chamber. The thrust coming out of the combustion chamber is proportional to the amount of fuel burned and the heat produced. In all commercial jet engines, there is no way to alter the air to fuel ratio. If the fuel entering the chamber increases or decreases the RPM of the turbine and therefore the air coming in increases or decreases proportionately to return the engine to the same "steady state."

In all liquid fueled engines, the fuel is stored at ambient temperature which in the case of jet travel can be below the freezing temperature of water at altitude. The fuel must be heated to approximately 400 degree C. to ignite. All the calories of heat used in raising the fuel temperature are lost and are a factor decreasing the efficiency of the engine.

Fuel and air continuously enter the combustion chamber and there is a finite time for the fuel to mix with the air and burn before exiting unburned. Traditional engines use various methods to improve the efficiency of burning. One is to increase the pressure which theoretically pushes the molecules closer together and increases the chance of interaction.

Most engines push the fuel through tight orifices to create micro droplets of fuel (atomization) increasing the surface area of the fuel. This increases the opportunity for the oxygen molecules to interact with the fuel. The droplets burn from the outside in and a portion of them still exit the engine unburned.

With heavy fuels such as kerosene and diesel, it is important not to let the fuel get hot as under heat and pressure these fuels will form a wax like substance called olefins that block the atomizer.

Heavy fuels include gasoline, kerosene, AvGas and diesel. They are composed of long chains of carbon atoms (12-18) with hydrogen atoms attached. To react chemically, the molecule must be "cracked" or broken up into one to two atom molecules. This requires both heat and time leading to a loss of a portion due to incomplete combustion.

Alternative fuels including hydrogen, ethane and propane, ethanol and methanol are smaller and react more completely, but these are not practical to store and carry with aircraft.

What is needed is a jet engine system that addresses these efficiency limitations of conventional jet engines. The disclosure solves this need. A jet engine system is disclosed that employs a separate compressor not directly attached to a turbine, the system capturing hot exhaust gases from the combustion chamber. By removing the rotating inner structure, it is now possible to add static structures to direct flow, decrease turbulence, or carry catalytic convertors to improve combustion and remove undesirable combustion products, such as nitrous oxide or carbon monoxide. In one embodiment, the jet engine system is an electrically decoupled jet engine comprising, an alternatively powered compressor that is wholly or in part electrically driven, a combustion chamber specifically designed to create a toroidal flow of air and to precrack and gasify any fuel and a rotational electric motor which drives a fuel supply into the combustion chamber. The toroidal flow of air mixes with the fuel and is combusted in the combustion chamber to create thrust. Features and aspects of the electrically decoupled jet engine and method of use are described in greater detail below.

SUMMARY

The present disclosure can provide a number of advantages depending on the particular aspect, embodiment, and/or configuration.

The disclosure describes an electrically decoupled jet engine with a toroidal flow combustion chamber, and method of use of an electrically decoupled jet engine with a toroidal flow combustion chamber.

In one embodiment, an electrically decoupled jet engine system is disclosed, the system comprising: a body having a longitudinal axis; an air intake duct routing a first air stream along the longitudinal axis; a combustion chamber having a central air inlet disposed at a proximal location, an inner casing defining an enclosed volume, an outer casing, and a diverter disposed within the enclosed volume at a distal location, the inner casing and the outer casing forming a casing gap channel around the inner casing, the inner casing having a set of air inlets arranged in radial patterns around the inner casing and passing through the inner casing, the enclosed volume having a throat disposed at a medial location; a set of fuel lines in fluid communication with the enclosed volume and disposed within the casing gap channel, the set of fuel lines containing a fuel; a rotational electric motor disposed distal to the combustion chamber and coupled to the set of fluid lines, the rotational electric motor providing power to supply the fuel contained in the fuel lines to the enclosed volume; wherein: the first air stream forms: i) a longitudinal air stream entering the combustion chamber through the central inlet and ii) a casing gap air stream entering the enclosed volume through the set of air inlets, the longitudinal air stream and the casing gap air stream forming a toroidal air stream within the enclosed volume; the toroidal air stream mixes in the combustion chamber with the fuel and combusts when ignited within the enclosed volume to create an exhaust stream; the exhaust stream exits through a thrust nozzle; and thrust is produced.

In one aspect, the fuel is a hydrocarbon, and the fuel air stream enters the combustion chamber in a pre-cracked state. In another aspect, the first air stream is supplied by a compressor, the compressor disposed externally to the combustion chamber. In another aspect, the combustion chamber further comprises a throat, the throat forming a reduced diameter within the combustion chamber. In another aspect, the set of air inlets are positioned upstream of the throat. In another aspect, the system further comprises a system controller that controls the rotational electric motor and controls at least one of the flow rate and the flow pressure of the fuel within the set of fuel lines. In another aspect, the set of air inlets comprise a first set of air inlets positioned at a first axial location along the longitudinal axis and a second set of air inlets positioned at a second axial location along the longitudinal axis. In another aspect, at least one of the first set of air inlets and the second set of air inlets comprise teardrop-shaped air inlets, and at least one of the first set of air inlets and the second set of air inlets comprise circularly-shaped air inlets. In another aspect, the fuel is a carbon negative fuel. In another aspect, the combustion chamber further comprises a set of fuel flow guides operating to direct the fuel into the combustion chamber.

In another embodiment, a method of using an electrically decoupled jet engine system to produce thrust is disclosed, the method comprising: providing an electrically decoupled jet engine system comprising: a body having a longitudinal axis; an air intake duct; a combustion chamber having a central air inlet disposed at a proximal location, an inner casing defining an enclosed volume, an outer casing, and a diverter disposed at a distal location, the inner casing and the outer casing forming a casing gap channel around the inner casing, the inner casing having a set of air inlets arranged in radial patterns around the inner casing and passing through the inner casing, the enclosed volume having a throat disposed at a medial location; a set of fuel lines in fluid communication with the enclosed volume and disposed within the casing gap channel, the set of fuel lines containing a fuel; and a rotational electric motor disposed distal to the combustion chamber and coupled to the set of fluid lines; receiving a first air stream; forming a longitudinal air stream and a casing gap air stream from the first air stream; flowing the longitudinal air stream into the enclosed volume; flowing the casing gap air stream into the casing gap channel and into the enclosed volume through the set of air inlets; forming a toroidal air stream within the enclosed volume; supplying fuel to the enclosed volume using power supplied by the rotational electric motor; mixing the toroidal air stream with the fuel to form a mixed fuel and air stream; combusting the mixed fuel and air stream to form a combustion exhaust stream; exiting the exhaust stream through a thrust nozzle; wherein: thrust is produced.

In one aspect, the fuel is a hydrocarbon. In another aspect, the fuel undergoes heating during flow within the set of fuel lines. In another aspect, the fuel enters the combustion chamber in a pre-cracked state. In another aspect, the combustion chamber further comprises a throat, the throat forming a reduced diameter within the combustion chamber. In another aspect, the wherein the combustion exhaust stream accelerates when flowing through the throat. In another aspect, the method further comprises a system controller that controls the rotational electric motor and controls at least one of the flow rate and the flow pressure of the fuel within the set of fuel lines. In another aspect, the set of air inlets comprise a first set of air inlets positioned at a first axial location along the longitudinal axis and a second set of air inlets positioned at a second axial location along the longitudinal axis. In another aspect, the set of air inlets comprise a first set of air inlets positioned at a first axial location along the longitudinal axis and a second set of air inlets positioned at a second axial location along the longitudinal axis. In another aspect, each of the first set of air inlets and the second set of air inlets comprise at least one of circularly-shaped air inlets and teardrop shaped air inlets.

In some embodiments, the disclosed electrically decoupled jet engine system or method of use incorporates aspects of U.S. patent application Ser. No. 16/383,513 to Clift, incorporated by reference in entirety for all purposes.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably. The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The terms "determine," "calculate" and "compute" and variations thereof, as used herein, are used interchangeably and include any type of methodology, process, mathematical operation or technique.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The term "module" as used herein refers to any known or later developed hardware, software, firmware, artificial intelligence, fuzzy logic, or combination of hardware and software that can perform the functionality associated with that element.

The phrase "graphical user interface" or "GUI" means a computer-based display that allows interaction with a user with aid of images or graphics.

The term "computer-readable medium" as used herein refers to any storage and/or transmission medium that participate in providing instructions to a processor for execution. Such a computer-readable medium is commonly tangible, non-transitory, and non-transient and can take many forms, including but not limited to, non-volatile media, volatile media, and transmission media and includes without limitation random access memory ("RAM"), read only memory ("ROM"), and the like. Non-volatile media includes, for example, NVRAM, or magnetic or optical disks. Volatile media includes dynamic memory, such as main memory. Common forms of computer-readable media include, for example, a floppy disk (including without limitation a Bernoulli cartridge, ZIP drive, and JAZ drive), a flexible disk, hard disk, magnetic tape or cassettes, or any other magnetic medium, magneto-optical medium, a digital video disk (such as CD-ROM), any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored. Computer-readable storage medium commonly excludes transient storage media, particularly electrical, magnetic, electromagnetic, optical, magneto-optical signals.

Moreover, the disclosed methods may be readily implemented in software and/or firmware that can be stored on a storage medium to improve the performance of: a programmed general-purpose computer with the cooperation of a controller and memory, a special purpose computer, a microprocessor, or the like. In these instances, the systems and methods can be implemented as program embedded on personal computer such as an applet, JAVA™ or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

Various embodiments may also or alternatively be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

BRIEF DESCRIPTION OF THE DRAWINGS

The disclosure will be readily understood by the following detailed description in conjunction with the accompanying drawings, wherein like reference numerals designate like elements. The elements of the drawings are not necessarily to scale relative to each other. Identical reference numerals have been used, where possible, to designate identical features that are common to the figures.

It should be understood that the proportions and dimensions (either relative or absolute) of the various features and elements (and collections and groupings thereof) and the boundaries, separations, and positional relationships presented there between, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto. FIGS. 3A-F are scaled drawings.

DETAILED DESCRIPTION

Reference will now be made in detail to representative embodiments. The following descriptions are not intended to limit the embodiments to one preferred embodiment. To the contrary, it is intended to cover alternatives, modifications, and equivalents as can be included within the spirit and scope of the described embodiments as defined, for example, by the appended claims.

Figure 1:
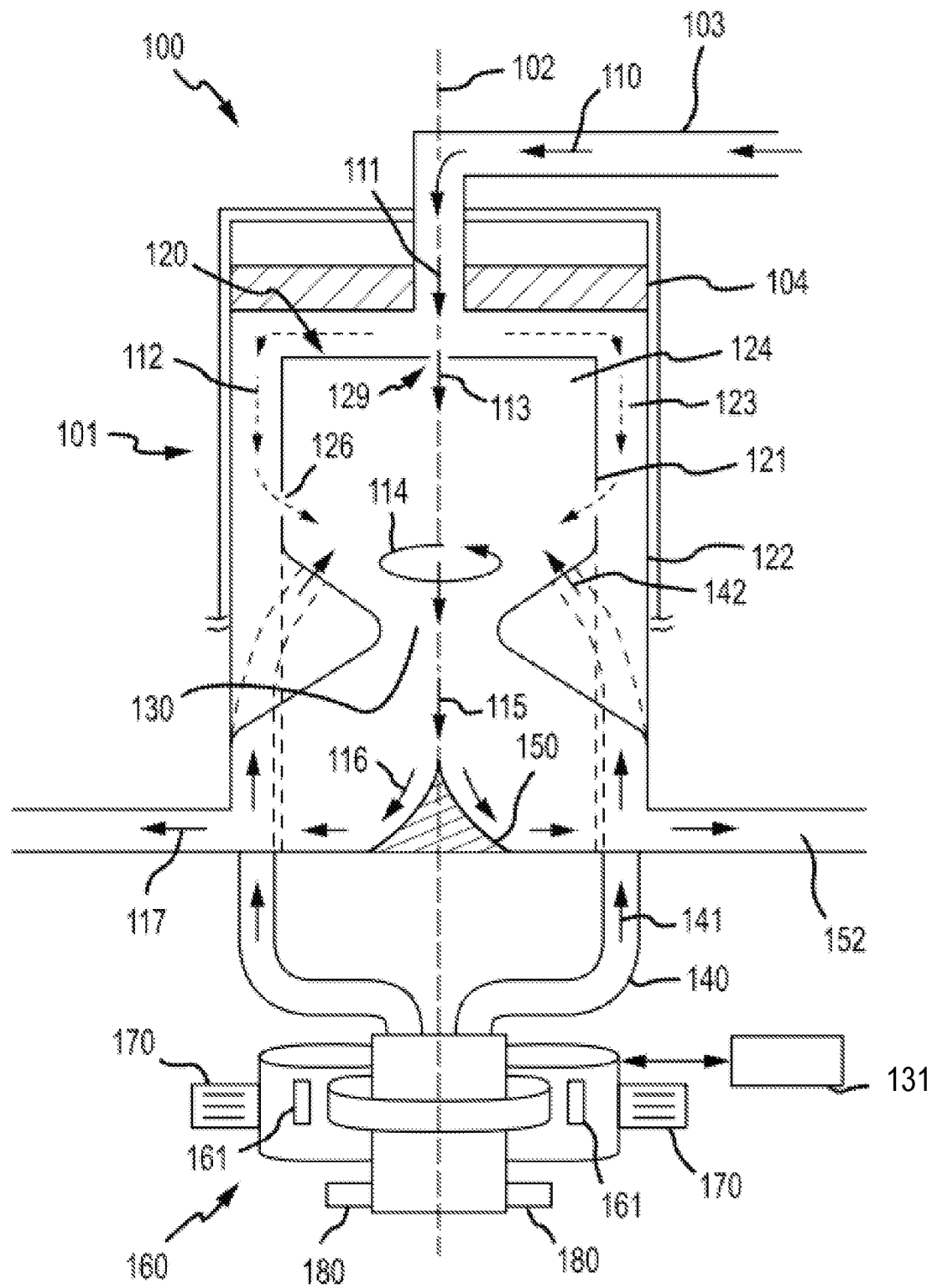
FIG. 1 shows a schematic diagram of one embodiment of an electrically decoupled jet engine system of the disclosure.
Figure 2:
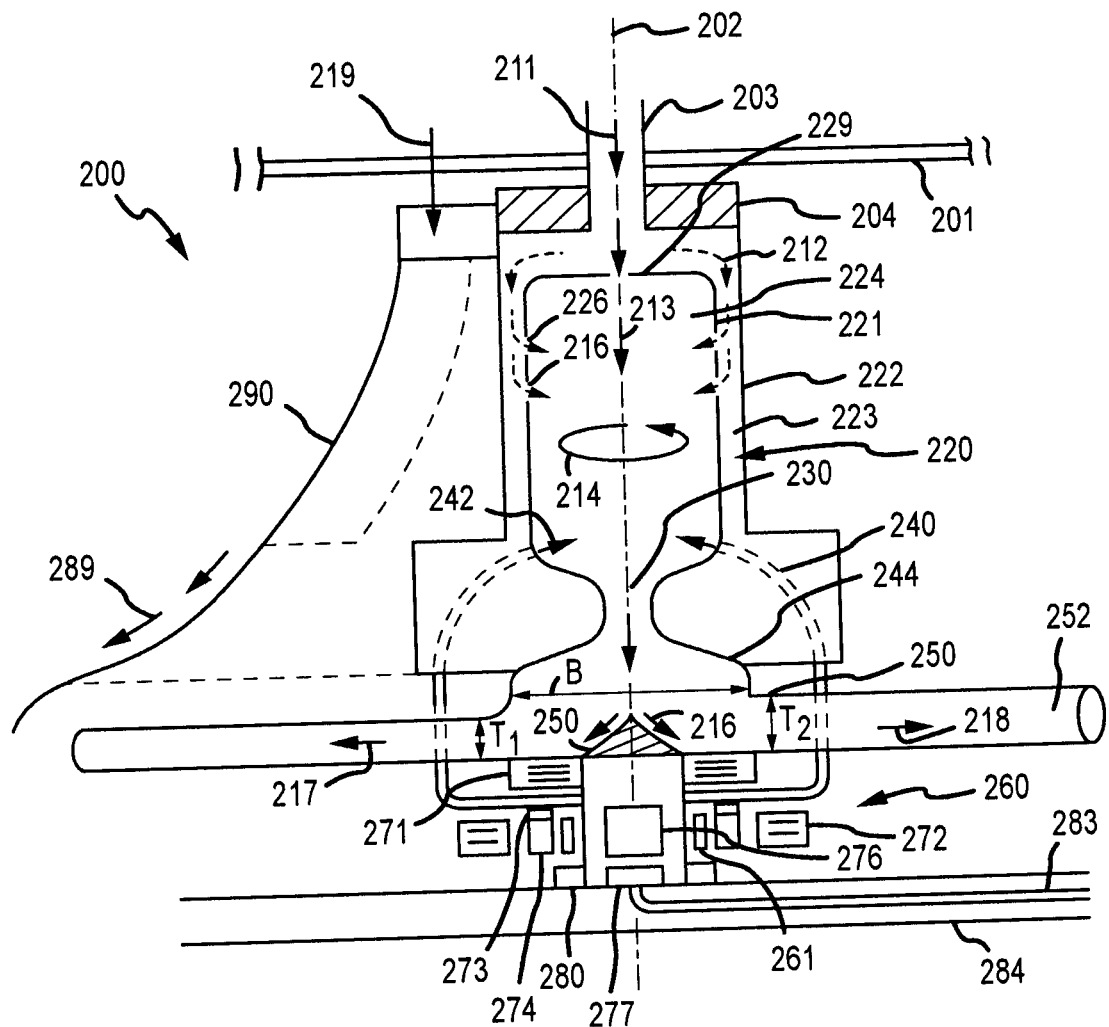
FIG. 2 shows a schematic diagram of another embodiment of an electrically decoupled jet engine system of the disclosure.

Each of FIGS. 1 and 2 describe respective embodiments of an electrically decoupled jet engine system 100, 200 and share similar features. The electrically decoupled jet engine 100 may be referred to as system 100 and the electrically decoupled jet engine system 200 may be referred to as system 200.

The electrically decoupled jet engine system 100 comprises a body 101 having a longitudinal axis 102, an air intake duct 103, a combustion chamber 120, a set of fuel lines 140 and a rotational electric motor 160. Generally, intake air forms a toroidal air stream 114 within the combustion chamber 120, the toroidal air stream 114 mixed with fuel pumped into the combustion chamber 120 by the rotational electric motor 160 and combusted to create thrust.

A body 101 of the electrically decoupled jet engine system 100 generally encloses the components of the electrically decoupled jet engine system 100 and is generally or substantially symmetrical about the longitudinal axis 102. The body 101 may be fitted with one or more attachment devices, such as flanges (not shown), to assist or enable mounting of the electrically decoupled jet engine system 100 to a vehicle or other larger system, such as an aerospace vehicle.

The electrically decoupled jet engine system 100 receives a duct air stream 110 from air intake duct 103. The duct air stream 110 may be provided from any number of sources as known to those skilled in the art, to include from sources that provide an air stream under pressure. In one embodiment, the duct air stream 110 is at least partially powered by the rotational electric motor 160. In one embodiment, the duct air stream 110 is provided by or output from a turbocompressor, such as that manufactured by Celerotron. The air intake duct 103 may initially be provided by an intake duct 103 running or positioned other than along the longitudinal axis 102, as shown in FIG. 1. Upon coupling or engagement with a proximal portion of the body 120 and/or a proximal portion of the combustion chamber 120, the duct air stream 110 is routed or flowed to be positioned along the longitudinal axis 102, forming first air stream 111. The first air stream 111 flows into or is received by the combustion chamber 120 at a proximal location of the combustion chamber 120 (at combustion chamber central air inlet 129). The first air stream 111 is a compressed air stream, meaning it is under pressure as provided by a compressor (not shown).

The upper or proximal portion of combustion chamber 120 is coupled with or engaged with a bearing 104. Bearing 104 may also be engaged with or coupled to body 101.

Figure 3A:
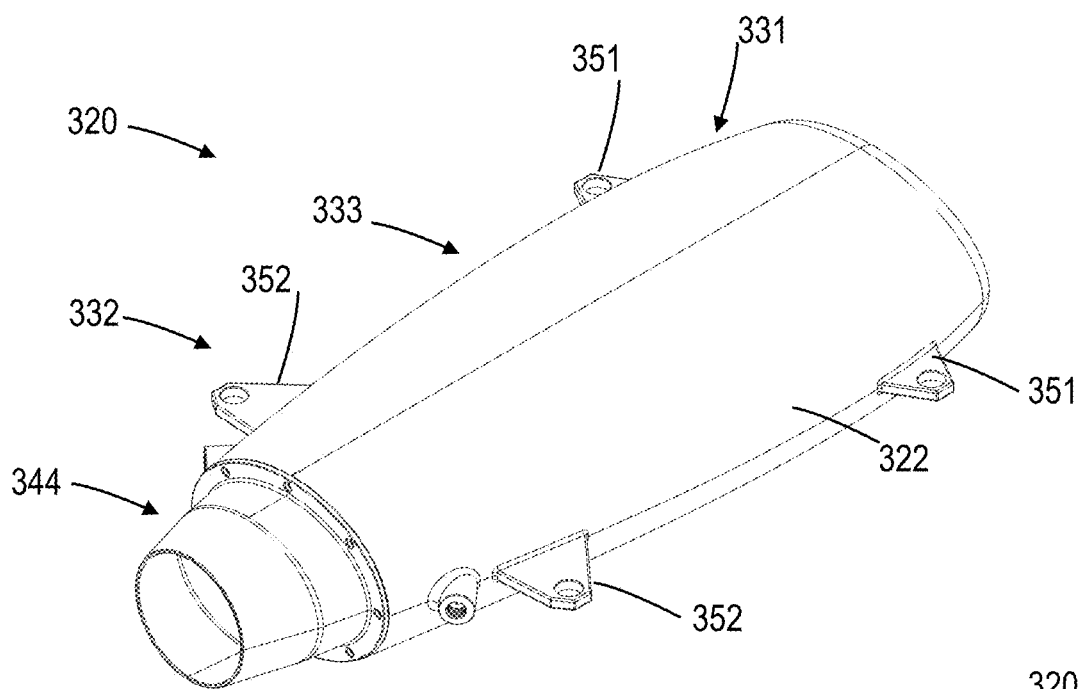
FIG. 3A shows a perspective view of the combustion chamber component of the electrically decoupled jet engine system of the disclosure.
Figure 3B:
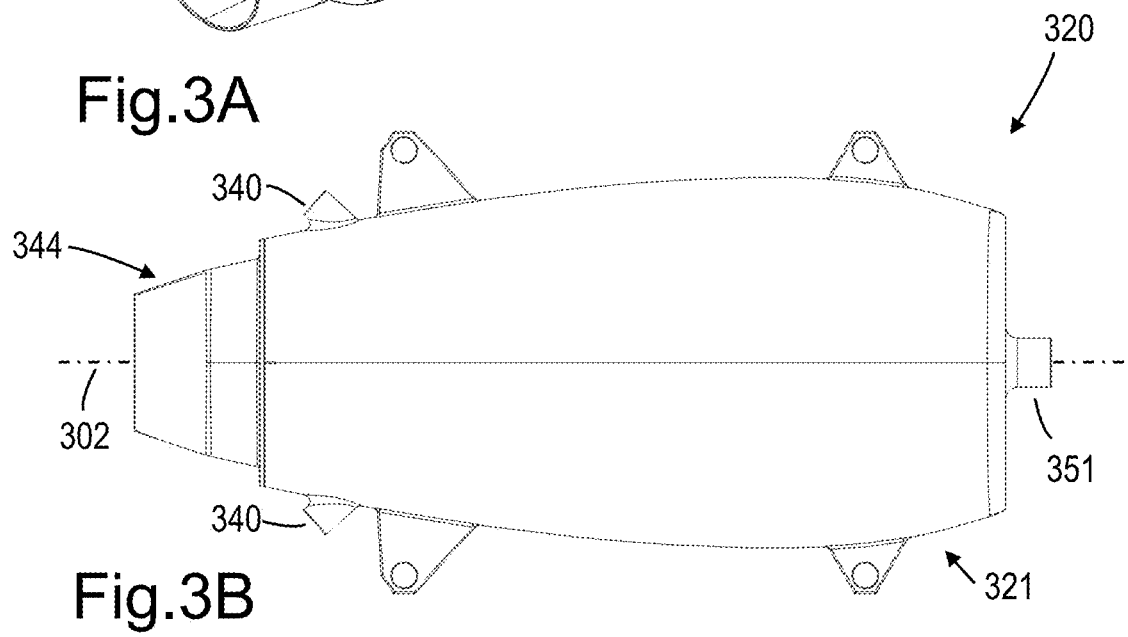
FIG. 3B shows a top view of the combustion chamber component of FIG. 3A.
Figure 3C:
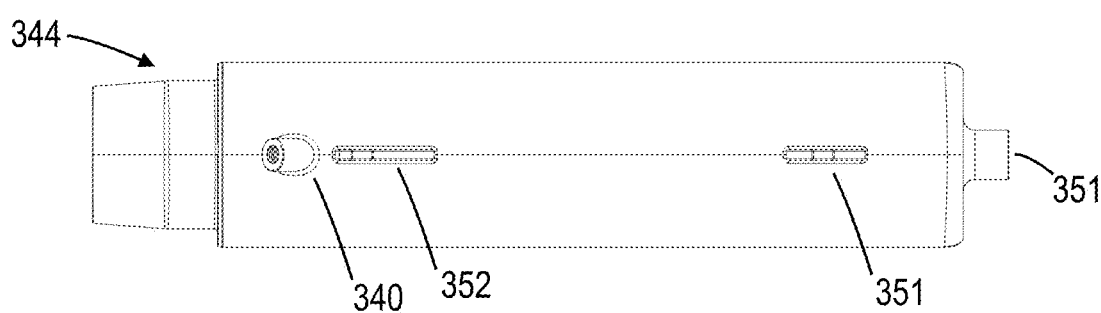
FIG. 3C shows a side view of the combustion chamber component of FIG. 3A.

First air stream 111, upon passing bearing 104, forms two fluid or air streams: a longitudinal air stream 113 that is received by the combustion chamber and a casing gap air stream 112. The longitudinal air stream 113 enters the combustion chamber at air inlet 129 (also, shown as element 303 as described below with respect to FIG. 3B). The casing gap air stream 112 flows radially outward from the longitudinal axis along casing gap air channel 123.

The combustion chamber 120 comprises a central air inlet 129 disposed at a proximal or upper location of the combustion chamber 120, an inner casing 121 defining an enclosed volume 124, an outer casing 122, and a diverter 150 disposed within the enclosed volume 124 at a distal location of the combustion chamber 120. The inner casing 121 and the outer casing 122 form a casing gap channel 123 around the inner casing 121. The inner casing 121 has a set of air inlets 126 (See FIGS. 3D-E for additional details regarding the set of air inlets) arranged in radial patterns around the inner casing 121 and passing through the inner casing 121, the enclosed volume 124 having a throat 130 disposed at a medial location of the combustion chamber 120. The set of air inlets 126 are positioned in an axially symmetrically manner. Stated another way, the set of air inlets 126 are positioned at the same longitudinal distance along the longitudinal centerline axis 202.

A set of fuel lines 140 are in fluid communication with the enclosed volume 124. The set of fuel lines 140 input or supply fuel to the enclosed volume at a medial location of the inner casing 121 of the combustion chamber 120.

The rotational electric motor 160 provides power to supply or pump the fuel contained in the fuel lines 140 to the combustion chamber 120. The fuel running within the fuel lines 140 forms fuel stream 141. Note the positioning of the fuel lines 140 adjacent the combustion chamber 120 allows or enables thermal energy transfer (e.g., heat energy) to the incoming fuel, which is beneficial because, among other things, the fuel provided is in a more efficient state (it is of higher temperature) for combustion. In one embodiment, the fuel, due to passing adjacent the relatively hot combustion chamber is partially or completely pre-cracked. (The term "pre-cracked" means that at least some of a fuel's complex organic molecules, such as long chain hydrocarbons or kerogens, are broken down into smaller molecules, such as light hydrocarbons.)

Jet engine performance is often limited by such factors as poor air fuel mixing, incomplete combustion, low burn temperatures and inadequate conversion of added kinetic energy (heat) to exit gas velocity (thrust). These problems cannot be overcome in traditional deign because of the presence of internal structures in the engine, temperature constraints, and constraints on the size and shape of the engine as well as location.

These problems may be addressed by way of a combustion chamber which incorporates a specific pattern of holes and air and fuel flow channels. The expanding hot gasses from the top and the concentric rings of air inlets along the body create a series of toroidal flow patterns that then become a helical toroid progressing out of the exit port of the combustion chamber. A helical toroid of this type maximizes mixing of reactants and directs and increases velocity of centrally located combustion products and air. This increases the thrust exiting the chamber.

Returning to the air streams engaging with the combustion chamber 120, the first air stream 11 forms: i) a longitudinal air stream 113 entering the enclosed volume 124 of the combustion chamber 120 through the central inlet 129 and ii) a casing gap air stream 112 entering the enclosed volume 124 through the set of air inlets 126, the longitudinal air stream 113 and the casing gap air stream 112 forming a toroidal air stream 114 within the enclosed volume 124. The toroidal air stream 114 mixes with the fuel stream 141 (to form a mixed fuel and air stream) and, when ignited (by igniter, not shown), produces a combustion reaction that emits or forms a combustion exhaust stream 115.

Stated another way, the compressed air (the longitudinal air stream 113) is passed to the combustion chamber 120 and the casing gap air stream 112 (also pressurized or compressed as it originates from (compressed air) first air stream 111 enters the combustion chamber 120 via the set of specifically located pores (set of air inlets 126). This configuration of combustion chamber also permits greater control over the movement of air and mixing within the combustion chamber more easily. For example, creating a vortex would permit the hot reaction products to be concentrated in the center and the cold, unreacted products to be pushed to the peripheral, increasing the efficiency. The colder unreacted products spinning to the periphery would protect the inside of the combustion chamber from the heat of reaction, permitting the center to be at much higher temperature than the metal could otherwise survive.

The combustion exhaust stream 115 flows toward diverter 150 wherein the combustion exhaust stream 115 is radially diverted or redirected (shown as stream 116) along thrust nozzle 152 to form thrust stream 117. In one embodiment, the combustion of the toroidal air stream 114 with the fuel stream 141 occurs substantially upstream of the throat 130. Note that the throat is a converging/diverging nozzle as is known to those skilled in the art.

The rotational electric motor 160 comprises a set of magnets 161 and is mounted radially between a set of colling fins 170. The rotational electric motor 160 is engaged with a set of bearing 180 at a distal location of the rotational electric motor 160. More details regarding the rotational electric motor are described below with respect to the rotational electric motor 260 of FIG. 2. In one embodiment, the rotational electric motor is any type of electric motor known to those skilled in the art. A controller 131 operates to control one or more components or elements of the electrically decoupled jet engine system 100. For example, the controller 131 may control the flow rate or volume of the duct air stream 110 (e.g., via a valve, not shown, positioned to operate on the air intake duct 103). The controller 131 may control the ratio of longitudinal air stream 113 that is received by the combustion chamber to the casing gap air stream 112 (e.g., via a value, not shown, positioned upstream of and near or adjacent the combustion chamber central air inlet 129). The controller may control operation of the rotational electric motor 160, to include fuel flow rates or volume of the fuel stream 141.

With attention to FIG. 2, the electrically decoupled jet engine system 200 comprises a body 201 having a longitudinal axis 202, an air intake duct 203, a combustion chamber 220, a set of fuel lines 240, and a rotational electric motor 260. Generally, intake air forms a toroidal air stream 214 within the combustion chamber 220, the toroidal air stream 214 mixed with fuel pumped into the combustion chamber 220 by the rotational electric motor 260 and combusted to create thrust.

A body 201 of the electrically decoupled jet engine system 200 generally encloses the components of the electrically decoupled jet engine system 200 and is generally or substantially symmetrical about the longitudinal axis 202. The body 201 may be fitted with one or more attachment devices, such as flanges (not shown), to assist or enable mounting of the electrically decoupled jet engine system 200 to a vehicle or other larger system, such as an aerospace vehicle.

The body 201 may be coupled or engaged with a shroud impeller or shroud 290 which may interact with or receive airstream 217. The shroud and/or shroud impeller provide additional thrust to the system 200. External airflow 218 may operate or flow along an outside surface of shroud 290.

The electrically decoupled jet engine system 200 receives a first air stream 211 from air intake duct 203. The first air stream 211 may be provided from any number of sources as known to those skilled in the art, to include from sources that provide an air stream under pressure. In one embodiment, the first air stream 211 is at least partially powered by (meaning pumped forward) by the rotational electric motor 260. In one embodiment, the first air stream 211 is provided by or output from a turbo-compressor, such as that manufactured by Celerotron. The first air stream 211 may initially be provided by an intake duct running or positioned other than along the longitudinal axis 202. The first air stream 211 is routed or flowed to be positioned along the longitudinal axis 202. The first air stream 211 flows into or is received by the combustion chamber 220 at a proximal location of the combustion chamber 220 (at combustion chamber central air inlet 229).

The upper or proximal portion of combustion chamber 220 is coupled with or engaged with a bearing 204. Bearing 204 may also be engaged with or coupled to body 201, shroud 290 and/or shroud impeller.

First air stream 211, upon passing bearing 204, forms two fluid or air streams: a longitudinal air stream 213 that is received by the combustion chamber and a casing gap air stream 212. The longitudinal air stream 213 enters the combustion chamber at central air inlet 229 (also, shown as element 303 as described below with respect to FIG. 3B). The casing gap air stream 212 flows radially outward from the longitudinal axis along casing gap air channel 223.

The combustion chamber 220 comprises a central air inlet 229 disposed at a proximal or upper location of the combustion chamber 220, an inner casing 221 defining an enclosed volume 224, an outer casing 222, and a diverter 250 disposed within the enclosed volume 224 at a distal location of the combustion chamber 220. The inner casing 221 and the outer casing 222 form a casing gap channel 223 around the inner casing 221. The inner casing 221 has a set of air inlets 226 (See FIGS. 3D-E for additional details regarding the set of air inlets) arranged in radial patterns around the inner casing 221 and passing through the inner casing 121, the enclosed volume 224 having a throat 230 disposed at a medial location of the combustion chamber 220.

The set of air inlets 226 are positioned in an axially symmetrically manner. The set of air inlets 226 form a set of two air lets, each set positioned at two axial locations of the combustion chamber. Stated another way, the set of air inlets 126 form two sets of axially symmetrical air inlets, each set positioned at a different longitudinal distance along the longitudinal centerline axis 202.

A set of fuel lines 240 are in fluid communication with the enclosed volume 224. The set of fuel lines 240 input or supply fuel to the enclosed volume at a medial (aka middle) location of the inner casing 221 of the combustion chamber 220.

The rotational electric motor 260 provides power to supply or pump the fuel contained in the fuel lines 240 to the combustion chamber 220. The fuel running within the fuel lines 240 form a fuel stream which enters the combustion chamber 220 as fuel stream 242. Note the positioning of the fuel lines 240 adjacent or near the combustion chamber 220 allows or enables thermal energy transfer (e.g., heat energy) to the incoming fuel, which is beneficial because, among other things, the fuel provided is in a more efficient state (it is of higher temperature) for combustion. In one embodiment, the fuel, due to passing adjacent the relatively hot combustion chamber is partially or completely pre-cracked.

Note that the fuel lines may enter the same cavity toward the hot exhaust end by absorbing radiant heat that would otherwise be lost to the environment, engine efficiency is improved. The passage of fuel adds to the colling of the inner lining. The calories of heat required to raise the fuel from storage temperature to ignition temperature comes from heat that was otherwise lost and not taxing the heat production within the combustion chamber. By super heating the fuel to above 220 degree C., the autoignition temperature, the engine design is simplified. Fuel combusts at approximately 30 m/s if the airflow through the engine exceeds this then the flame is "blown out" of the engine (many engines include flame stabilizer plates or toroidal flow to prevent this). The super heating of the fuel means that it ignites on contact with the air and therefore no additional complexity is needed. The following document is incorporated by reference for all purposes: Optimal Reynolds Number for liquid-liquid mixing in helical pipes, by Mansour et al, Chemical Engineering Science, Vol. 214, Mar. 16, 2020.

Returning to the air streams engaging with the combustion chamber 220, the first air stream 211 forms: i) a longitudinal air stream 213 entering the enclosed volume 224 of the combustion chamber 220 through the central inlet 229 and ii) a casing gap air stream 212 entering the enclosed volume 224 through the set of air inlets 226, the longitudinal air stream 213 and the casing gap air stream 212 forming a toroidal air stream 214 within the enclosed volume 224. The toroidal air stream 214 mixes with the fuel stream 241 (to form a mixed fuel and air stream) and, because the fuel is exposed to heat as it traverses the fuel lines inside the wall it is pre-cracked to smaller molucules including ethane, methane and hydrogen and is above the ignition temperature and spontaneously ignites when it comes in contact with the oxygen in the air, this produces a combustion reaction that emits or forms a combustion exhaust stream. The combustion exhaust stream flows toward diverter 250 wherein the combustion exhaust stream is radially diverted or redirected (shown as stream 216) along thrust nozzle 252 to form thrust streams 217 and 218. In one embodiment, the combustion of the toroidal air stream 214 with the fuel stream 241 occurs substantially upstream of the throat 230. Note that the throat is a converging/diverging nozzle as is known to those skilled in the art. Note also the combustion exhaust stream, downstream of throat 230, expands within bell 244 (bell 244 has maximum diameter B). Also, combustion exhaust stream 217 flows in thrust nozzle of diameter Ti and combustion exhaust stream 218 flows in thrust nozzle of diameter T2.

The rotational electric motor 260 comprises a set of radially positioned magnets 261, a circular or ring-shaped first coil 274 and second coil 273, rotor 276, and stator 277. Each of these components are positioned or disposed symmetrically about longitudinal axis 202. Generally, the rotation of the rotor 276 (with attached radially positioned magnets 261) induces an electrical current in the stator 277 (with its ring-shaped first coil 274 and second coil 273), the electrical current used to power components of the system 200, such as to provide power to pump the fuel within fuel line 240. The rotational electric motor 260 may engage with or be coupled to bearing 280. A first set of colling fins 271 are positioned at a proximal location to the rotational electric motor 260 and a second set of colling fins 272 are positioned at a distal location to the rotational electric motor 260. In one embodiment, the rotational electric motor 260 is a Technotion motor.

A controller (note shown, but similar to controller 131 of FIG. 1) operates to control one or more components or elements of the electrically decoupled jet engine system 200. For example, the controller may control the flow rate or volume of the first air stream 211 (e.g., via a valve, not shown, positioned to operate on the air intake duct 203). The controller may control the ratio of longitudinal air stream 213 that is received by the combustion chamber to the casing gap air stream 212 (e.g., via a value, not shown, positioned upstream of and near or adjacent the combustion chamber central air inlet 229). The controller may control operation of the rotational electric motor 260, to include fuel flow rates or volume of the fuel stream 241.

In one embodiment, the fuel is a hydrocarbon. In one embodiment, the fuel is other than a hydrocarbon. In one embodiment, the fuel is any engine fuel known to those skilled in the art.

FIGS. 3A-F show a set of views of the combustion chamber 320 component of the electrically decoupled jet engine system of FIGS. 1 and 2. Combustion chamber 320 comprises a proximal portion 331 fitted with an air intake port 303 (similar to air intake 129 of system 100 of FIG. 1 and air intake 229 of system 200 of FIG. 2), a medial (aka middle) portion 333, and a distal portion 332 comprising an end portion 344 (which may, in some embodiments, form a nozzle) and a set of two fuel ports 340. The outer casing 322 forms an exterior surface of the combustion chamber 320. A set of flanges are attached to the outer casing 322: a set of two distal flanges 352 and a set of two proximal flanges 351. The flanges 352, 351 enable attachment of the combustion chamber 320 with an electrically decoupled jet engine system, such as to body 201 of electrically decoupled jet engine system 200 or to body 101 of electrically decoupled jet engine system 100. Note that air flows from combustion chamber proximal portion 331 to combustion chamber distal portion 332. Stated another way, the air flows from air intake port 303 to end portion 344.

Figure 3D:
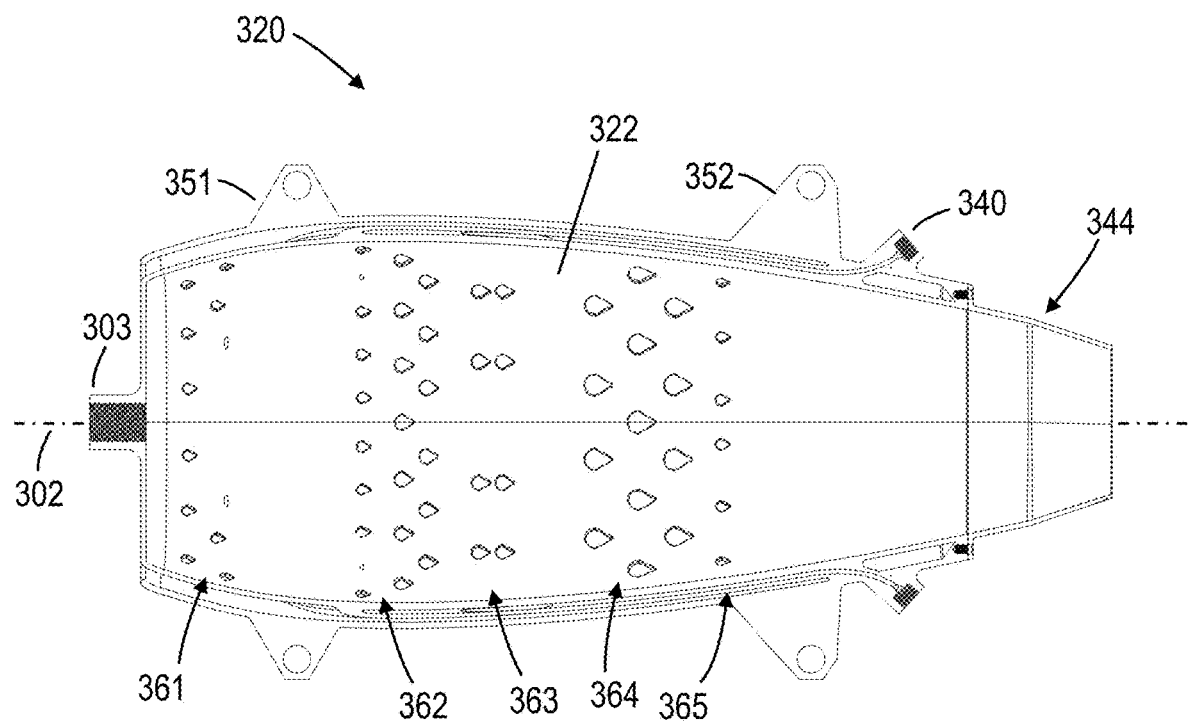
FIG. 3D shows a cut-away top view of the combustion chamber component of FIG. 3A with a first embodiment of a set of air inlets.
Figure 3E:
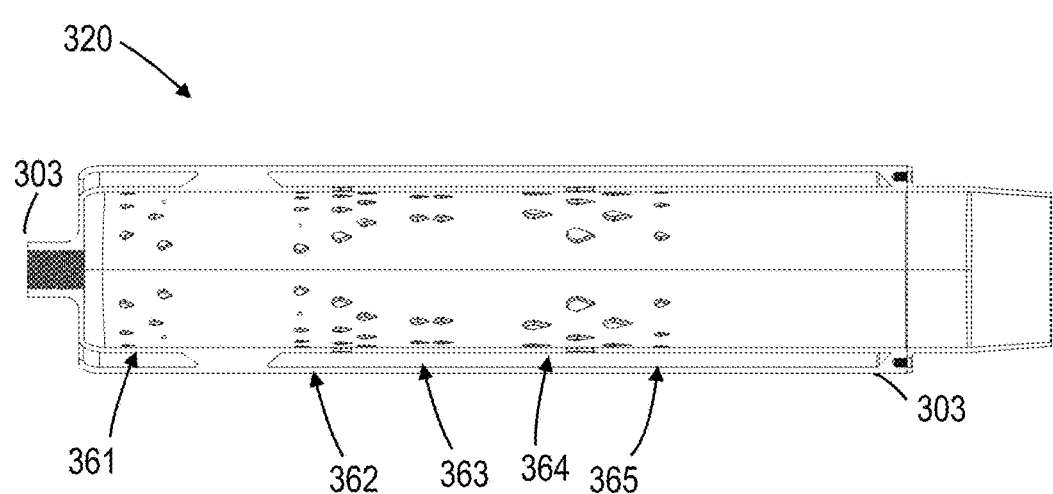
FIG. 3E shows a cut-away side view of the combustion chamber component of FIG. 3A with the same embodiment of a set of air inlets as that of FIG. 3D.
Figure 3F:
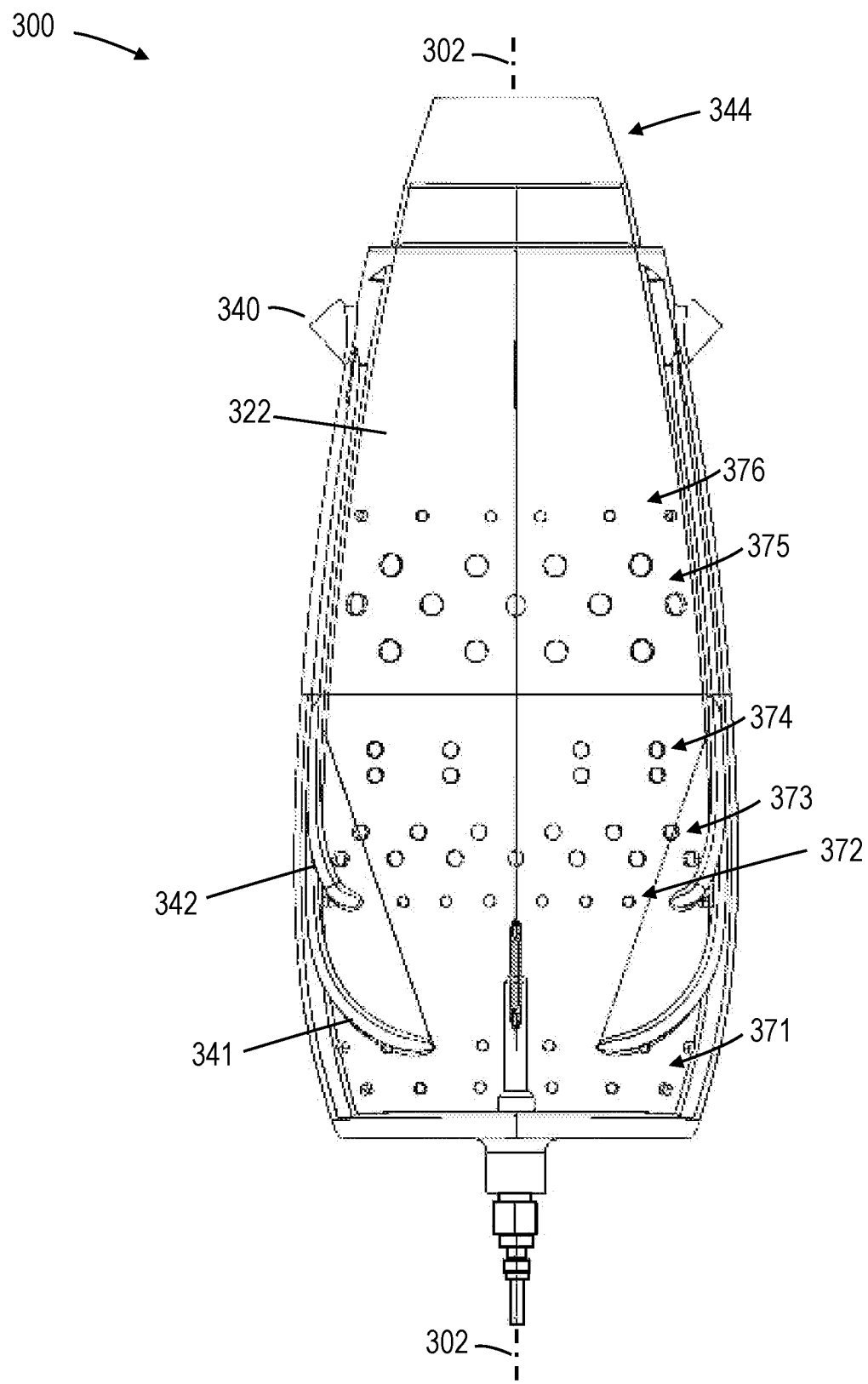
FIG. 3F shows a cut-away top view of the combustion chamber component of FIG. 3A with a second embodiment of a set of air inlets.

With attention to FIGS. 3D-F, a series of cut-away views of the combustion chamber 320 are provided which illustrate a series of sets of air inlets. FIGS. 3D-E shows cut-away views of the combustion chamber component of FIG. 3A with a first embodiment of a set of air inlets. FIG. 3F shows a cut-away view of the combustion chamber component of FIG. 3A with a second embodiment of a set of air inlets.

In FIGS. 3D-E, combustion chamber 320 comprises air intake port 303, outer casing 322, a set of two distal flanges 352, a set of two proximal flanges 351, a set of two fuel ports 340, and five sets of air inlets 361-365. Each of the inlets of any given air inlet set pass through the combustion chamber inner casing to enable fluid communication between the casing air gap and the combustion chamber enclosed volume (as described above with respect to system 100 of FIG. 1 and system 200 of FIG. 2). Air inlet set one 361 is positioned at a most proximal portion of the outer casing 322 (aka the exterior surface) of the combustion chamber 320 at the combustion chamber proximal portion 331 and comprises a set of voids or apertures along a set of common axial locations along the combustion chamber longitudinal axis. The shapes of most of the voids or apertures of air inlet set one 361 are a teardrop shape. A series of four more air inlet sets (respectively air inlet set two 362, air inlet set three 363, air inlet set four 364, and air inlet set five 365) are positioned on the outer casing 322. The shapes of each of the voids or apertures of each of air inlet set two 362, air inlet set three 363, air inlet set four 364, and air inlet set five 365 are a teardrop shape. Other shapes for the voids are possible, to include circular shapes, oblong shapes, and rectangular or square shapes.

In the second embodiment of a set of air inlets of the combustion chamber 320 of the system 100 or system 200, six sets of air inlets 371-376 are provided. Each of the inlets of any given air inlet set pass through the combustion chamber inner casing to enable fluid communication between the casing air gap and the combustion chamber enclosed volume (as described above with respect to system 100 of FIG. 1 and system 200 of FIG. 2). Air inlet set one 371 is positioned at a most proximal portion of the outer casing 322 (aka the exterior surface) of the combustion chamber 320 at the combustion chamber proximal portion 331 and comprises a set of voids or apertures along a set of two common axial locations along the combustion chamber longitudinal axis. The shapes of all of the voids or apertures of air inlet set one 371 are circular. A series of five more air inlet sets (respectively air inlet set two 372, air inlet set three 373, air inlet set four 374, air inlet set five 375, and air inlet set six 376) are positioned on the outer casing 322. The shapes of each of the voids or apertures of each of air inlet set two 362, air inlet set three 363, air inlet set four 364, air inlet set five 365, and air inlet set six 376 are of a circular shape.

Air inlet set two 372 has a set of one ring of voids or apertures, each void about the same diameter as the voids of air inlet set one 371. Air inlet set three 373 has a set of two rings of voids or apertures, each ring at a common axial location along the longitudinal axis of the combustion chamber 320, each void of a circular diameter slightly larger than those of inlet set two 372. Air inlet set four 374 has a set of two rings of voids or apertures, each ring at a common axial location along the longitudinal axis of the combustion chamber 320, each void of a circular diameter slightly larger than those of inlet set three 373. Air inlet set five 375 has a set of three rings of voids or apertures, each ring at a common axial location along the longitudinal axis of the combustion chamber 320, each void of a circular diameter slightly smaller than those of inlet set three 373 and inlet set four 374. And air inlet set six 376 has a set of one ring of voids or apertures, each void about the same diameter as the voids of air inlet set one 371.

The combustion chamber 320 of FIG. 3F also comprises a set of fuel guides 341, 342. First fuel guides 341 extend to a first distance toward the combustion chamber 320 longitudinal axis and are axially symmetrical about the longitudinal axis. Second fuel guides 342 extend to a second distance (less than the first distance) toward the combustion chamber 320 longitudinal axis and are axially symmetrical about the longitudinal axis. Each of the fuel guides 341, 342 enable directional guidance to the delivery fuel to the enclosed volume of the combustion chamber.

Figure 4:
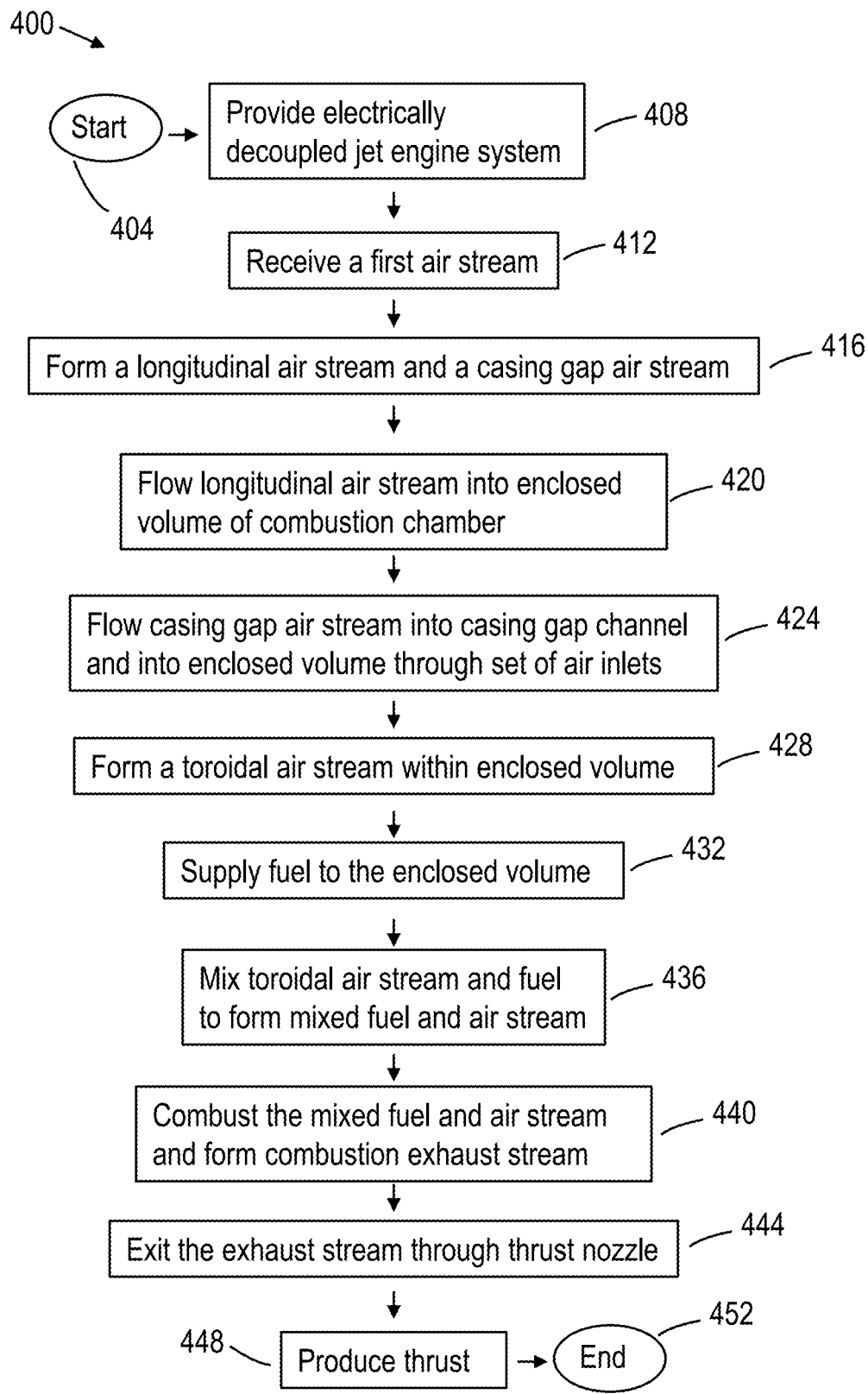
FIG. 4 shows a flowchart of one method of use of an electrically decoupled jet engine system, such as the embodiments of FIGS. 1 and 2 using the combustion chamber component of FIGS. 3A-F.

With attention to FIG. 4, a method of use of an electrically decoupled jet engine, such as the embodiments of FIGS. 1 and 2 using the combustion chamber component of FIGS. 3A-F, is described. The flowchart or process diagram of FIG. 1 starts at step 404 and ends at step 352. Any of the steps, functions, and operations discussed herein can be performed continuously and automatically. The steps are notionally followed in increasing numerical sequence, although, in some embodiments, some steps may be omitted, some steps added, and the steps may follow other than increasing numerical order. The method of use 400 of FIG. 4 may be referred to as method 400, and may refer to components, elements, and/or features of FIG. 1-3.

After starting at step 404, the method 100 proceeds to step 408 wherein an electrically decoupled jet engine system, such as the electrically decoupled jet engine system 100 of FIG. 1 or the electrically decoupled jet engine system 200 of FIG. 2, is provided. After completing step 408, the method 400 proceeds to step 412.

At step 412, the system receives a first air stream, such as first air stream 111 described above with respect to FIG. 1, or the first air stream 211 described above with respect to FIG. 2. The first air stream is provided as a pressurized air stream and may be controlled by a system controller. For example, the flow rate and or pressure of the first air stream may be controlled by controller. After completing step 412, the method 400 proceeds to step 416.

At step 416, the method 400 forms, from the received first air stream, each of a longitudinal air stream and a casing gap air stream. The longitudinal air stream flows parallel to or in line with the longitudinal axis of the electrically decoupled jet engine system and parallel to or in line with the longitudinal axis of the combustion chamber. The system controller may control aspects of the formation of these two fluid streams, e.g., the controller may control the ratio of the two fluid streams, the pressure and/or flow rate of one or both streams, temperature of the one or both fluid streams, and the like. After completing step 416, the method 400 proceeds to step 420.

At step 420, the longitudinal air stream is flowed into and received by the combustion chamber, the longitudinal air stream flowing into the enclosed volume of the combustion chamber. The longitudinal air stream is received at a proximal portion of the combustion chamber through a central air inlet disposed or positioned along the longitudinal axis of the combustion chamber. After completing step 420, the method 400 proceeds to step 424.

At step 424, the casing gap air stream is flowed into and received by the casing gap of the combustion chamber, wherein in the casing gap air stream first floes radially outward from the central air inlet to the cylindrically shaped casing gap of the combustion chamber. The casing gap air stream then travels of flows parallel tot eh longitudinal axis of the combustion chamber and encounters one or more sets of air inlets. The casing gap air stream then enters of flows into the one or more sets of air inlets and into the enclosed volume of the combustion chamber. After completing step 424, the method 400 proceeds to step 428.

At step 428, the casing gap air stream, due to (among other things) the geometries of the enclosed volume and the configuration and/or geometries of the set of air inlets, forms a toroidal air stream within the enclosed volume. After completing step 428, the method 400 proceeds to step 432.

At step 432, fuel is supplied to the enclosed volume. The pumping of the fuel is enabled by or powered by the rotational electric motor. The fuel flow or operation may be controlled by the system controller. For example, the system controller may control fuel flow rate, pressure, temperature, and the like. As described above, the fuel, when entering the enclosed volume, may be heated to a temperature that allows pre-carking of the fuel. The fuel may enter the enclosed volume of the combustion chamber at one or more locations, to include a distal portion, medial portion, and/or a proximal portion of the combustion chamber and may be facilitated by one on more fuel guides. In one embodiment, the fuel may enter the combustion chamber and form a toroidal fuel stream. After completing step 432, the method 400 proceeds to step 434.

At step 436, the toroidal air stream and the fuel stream are mixed to form a mixed fuel and air stream. The mixed fuel and air stream may form a toroidal mixed fuel and air stream. In one embodiment, the mixed fuel and air stream is formed upstream (closer to the central air inlet than closer to the nozzle) of the throat of the combustion chamber. In one embodiment, the mixed fuel and air stream is formed substantially upstream of the throat of the combustion chamber. After completing step 436, the method 400 proceeds to step 440.

At step 440, the mixed fuel and air stream is ignited and combusted, creating an exhaust stream. In one embodiment, the combustion of the mixed fuel and air stream occurs upstream of the throat of the combustion chamber. In one embodiment, the combustion of the mixed fuel and air stream occurs substantially upstream of the throat of the combustion chamber. After completing step 440, the method 400 proceeds to step 444.

At step 444, the exhaust stream exits through a thrust nozzle. After completing step 444, the method 400 proceeds to step 448.

At step 448, thrust is produced. After completing step 448, the method 400 proceeds to step 448 where the method 400 stops Generally, as disclosed above, using a separate compressor not directly attached to a turbine, and capturing hot exhaust gases from the combustion chamber, creates several advantages over the above-described conventional approach (of a compressor directly driven by a shaft, the shaft itself directly driven by a turbine). (Such a configuration may be termed a "distributed architecture" as pieces of the system may be positioned or distributed in different physical locations, to include the compressor, combustion chamber, etc., enabling de-coupling of coupled design requirements or design constraints among the components and thus leading to more optimal designs of the individual components). For example, the speed of the compressor (air flow) may be independent from the fuel flow. Air/fuel ratio and compression ratio can be altered. Also, the design of the axial or centrifugal compressor stage may be optimized for the ideal RPM and torque of the driving motor optimizing efficiency, and the compressor may be on air or magnetic bearings (these cannot operate in the temperatures of the traditional jet engines). Furthermore, no lubricant needs to be added to the fuel or pumped into bearings inside the engine; this simplifies the engine design, decreasing the number of components and decreasing polluting by-products as the lubricant is burned with the exiting thrust. Also, the motor driving the compressor turbine may be electrical, hydraulic, piston, or a separately functioning "gas" turbine, and when an electric compressor is used, power may be supplied by a generator somehow directly driven by the engine, battery or separate alternate power unit (APU). Additionally, because the compressor system is not directly tied to the fuel/combustion chamber, it may have significantly less angular momentum. Thus, the engine may be spooled up and down rapidly and it can be tuned to operate with different fuels on the fly.

A decoupled compressor and combustion system (as disclosed above), whether electric or other, allows the possibility of radically altering aircraft design, as the engine is no longer a cylinder that needs to be located under a wing or on the body. For example: the intake may be located where and however it performs best and reduces drag (e.g., on the nose or leading edge of a wing where air resistance is greatest; the combustion chamber may be located away from cargo, passenger or fuel tanks and even surrounded by noise abating materials; and/or thrust may be vectored or exit out locations which optimize flight characteristics, such as the trailing edge of the wing where it may add to lift decrease the needed wing area and reducing cabin noise.

In one embodiment, the thrust is directed through radially positioned pipes built into a disk; the thrust exists tangentially to the disk, and the torque generated by the rotation of the disk is connected to a centrally located generator.

In another embodiment, the thrust is directed along pipes located inside a rotor; the thrust exists at some point along the rotor on the tailing edge, and the rotors are connected to a central hub which may incorporate a power generator.

In a further embodiment, such a power generator is a "wagon wheel" shaped permanent magnet motor. In this design, a ring of magnets surrounds a tube or shaft, and a ring shaped coil is located outside this ring driving the motor or generating electricity. In this configuration, fuel, air and/or wiring may pass up through the center of the ring as the combustion chamber and hot exhaust gases are separated from the various types of bearing, including air (gas) or magnetic bearings which may support the tube or shaft.

Note that by separating the shaft, turbine, stator (in the process of deflecting the thrust the stator must absorb some energy, thus decreasing the efficiency of the engine), and compressor from the engine (as disclosed above), a number of advantages are created. For example, the engine may run at a higher temperature. Traditional engines run on kerosene at 900 to 1000 degrees. The theoretical maximum temperature of burning Kerosene in oxygen is 3400 degrees centigrade. By burning at higher temperatures, combustion is more efficient and greater thrust may be produced for the same amount of fuel and weight of engine. This is possible because there are no temperature sensitive metal structures and bearings near or directly in the flow of exhaust gases.

By way of example, in the 1950's the Rolls Royce Nene engine had a centrifugal compressor that fed into multiple combustion chambers placed radially around the shaft. The combustion products flowed out of the combustion chamber across a stator blade that directed the flow at the rotor blades on the turbine. The metals used would melt above 1500 degree C. limiting the possible combustion chamber temperature.

In traditional jet engines, the air passes out of the compressor through a stator blade and/or a diffuser, and then passes into the combustion chamber more or less as a direct column of air.

In one embodiment, the centrally located electric motor may be used not only to generate electricity to the electrically powered compressor but to provide power to the craft and payload. In addition, the electric motor connected to a suitable power control system would be able to add to, or subtract from, the torque produced by the jet engine, providing a rapid and fine degree of control.

In one embodiment, the entire engine structure and thrust exits pipes can be made using 3d metal printing. This permits complex ad fine paths that are difficult if not impossible using traditional sheet and welding techniques. The 3d metal printed engine is fabricated using one contiguous "weld pool" removing weak points, junctions of different metals, changes in crystalline structure, and different expansion and contraction zones all of which contribute to engine failure.

In one embodiment, the thrust from the combustion chamber is directed into a plurality of radially placed conduits that exit from a disk and directly provide torque for attached rotor blades or an attached planetary gear. The rotor blade "disk jet" combination is placed into the wing of an aircraft to provide vertical lift and to contribute to lift created by an airfoil.

In another embodiment, the thrust transmitting conduits are located inside a rotor and the rotating blades are located in the wing of an aircraft. In one embodiment, the location of the incoming fuel lines (adjacent the combustion chamber) provides a cooling effect to the combustion chamber. In one embodiment, the electrical system is used to start the engine.

In one embodiment, the system uses a carbon negative fuel. The phrase "carbon negative fuel" or "carbon dioxide-equivalent negative" means a fuel in which the greenhouse gases (GHGs) generated by its use are less than the GHGs removed by its production when calculated on a carbon dioxide-equivalent basis. In one embodiment, the system uses a carbon neutral fuel. The phrase "carbon neutral" means a fuel in which the greenhouse gases generated by its use is the same as the amount of carbon dioxide removed from the atmosphere. In one embodiment, the system uses a light hydrocarbon (meaning a hydrocarbon with low molecular weight such as methane, ethane, propane, and butane). In one embodiment, the system uses a heavy hydrocarbon (meaning a heterogeneous mixture of compounds consisting mainly of alkylated cyclins, resins and asphaltenes). In one embodiment, the system uses a biodiesel fuel, canola oil, and/or vegetable oil. In one embodiment, the system operates with a mixture of the above-identified fuels. Note that the ability to use such alternative fuels is enabled by, among other things, the fuel lines operating in without flow restrictions or constraints common in convention engine designs.

In one embodiment, the system or components of the system are used for ground-based power, such as industrial power generators used in, for example, industrial power.

The above embodiments may, in combination or separately, may utilize computer software and/or computer hardware (to include, for example, computer-readable mediums) for any of several functions such as automated control and state estimation, and furthermore may utilize one or more GUIs for human interaction with modules or elements or components.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

The exemplary systems and methods of this disclosure have been described in relation to jet engines. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, while the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A jet engine system comprising:
    a body having a longitudinal axis;
    an air intake duct routing a first air stream along the longitudinal axis;
    a combustion chamber having a central air inlet disposed at a proximal location, an inner casing defining an enclosed volume, an outer casing, and a diverter disposed within the enclosed volume at a distal location, the inner casing and the outer casing forming a casing gap channel around the inner casing, the inner casing having a set of air inlets arranged in radial patterns around the inner casing and passing through the inner casing, the enclosed volume having a throat disposed at a medial location;
    a set of fuel lines in fluid communication with the enclosed volume and disposed within the casing gap channel, the set of fuel lines containing a fuel;
    a rotational electric motor disposed distal to the combustion chamber and coupled to the set of fuel lines, the rotational electric motor providing power to supply the fuel contained in the fuel lines to the enclosed volume;
    wherein:
    the first air stream forms: i) a longitudinal air stream entering the combustion chamber through the central inlet and ii) a casing gap air stream entering the enclosed volume through the set of air inlets, the longitudinal air stream and the casing gap air stream forming a toroidal air stream within the enclosed volume;

the toroidal air stream mixes in the combustion chamber with the fuel and combusts when ignited within the enclosed volume to create an exhaust stream;

the exhaust stream exits through a thrust nozzle; and thrust is produced.

2. The system of claim 1, wherein the fuel is a hydrocarbon and the first air stream enters the combustion chamber in a pre-cracked state.

3. The system of claim 1, wherein the first air stream is supplied by a compressor, the compressor disposed externally to the combustion chamber.

4. The system of claim 1, wherein the throat forms a reduced diameter within the combustion chamber.

5. The system of claim 1, wherein the set of air inlets are positioned upstream of the throat.

6. The system of claim 1, further comprising a system controller that controls the rotational electric motor and controls at least one of a flow rate and a flow pressure of the fuel within the set of fuel lines.

7. The system of claim 1, wherein the set of air inlets comprise a first set of air inlets positioned at a first axial location along the longitudinal axis and a second set of air inlets positioned at a second axial location along the longitudinal axis.

8. The system of claim 7, wherein: at least one of the first set of air inlets and the second set of air inlets comprise teardrop-shaped air inlets, and at least one of the first set of air inlets and the second set of air inlets comprise circularly-shaped air inlets.

9. The system of claim 1, wherein the fuel is a carbon negative fuel.

10. The system of claim 1, wherein the combustion chamber further comprises a set of fuel flow guides operating to direct the fuel into the combustion chamber.

11. A method of using a jet engine system to produce thrust, the method comprising:

providing a jet engine system comprising:
  a body having a longitudinal axis;
  an air intake duct;
  a combustion chamber having a central air inlet disposed at a proximal location, an inner casing defining an enclosed volume, an outer casing, and a diverter disposed at a distal location, the inner casing and the outer casing forming a casing gap channel around the inner casing, the inner casing having a set of air inlets arranged in radial patterns around the inner casing and passing through the inner casing, the enclosed volume having a throat disposed at a medial location;
  a set of fuel lines in fluid communication with the enclosed volume and disposed within the casing gap channel, the set of fuel lines containing a fuel; and
  a rotational electric motor disposed distal to the combustion chamber and coupled to the set of fuel lines;

receiving a first air stream;

forming a longitudinal air stream and a casing gap air stream from the first air stream;

flowing the longitudinal air stream into the enclosed volume;

flowing the casing gap air stream into the casing gap channel and into the enclosed volume through the set of air inlets;

forming a toroidal air stream within the enclosed volume;

supplying fuel to the enclosed volume using power supplied by the rotational electric motor;

mixing the toroidal air stream with the fuel to form a mixed fuel and air stream;

combusting the mixed fuel and air stream to form a combustion exhaust stream;

exiting the exhaust stream through a thrust nozzle;

wherein:

thrust is produced.

12. The method of claim 11, wherein the fuel is a hydrocarbon.

13. The method of claim 12, wherein the fuel undergoes heating during flow within the set of fuel lines.

14. The method of claim 11, wherein the fuel enters the combustion chamber in a pre-cracked state.

15. The method of claim 11, wherein the throat forms a reduced diameter within the combustion chamber.

16. The method of claim 15, wherein the combustion exhaust stream accelerates when flowing through the throat.

17. The method of claim 11, further comprising a system controller that controls the rotational electric motor and controls at least one of a flow rate and a flow pressure of the fuel within the set of fuel lines.

18. The method of claim 11, wherein the set of air inlets comprise a first set of air inlets positioned at a first axial location along the longitudinal axis and a second set of air inlets positioned at a second axial location along the longitudinal axis.

19. The method of claim 11, wherein the fuel is a carbon negative fuel.

20. The method of claim 18, wherein each of the first set of air inlets and the second set of air inlets comprise at least one of circularly-shaped air inlets and teardrop shaped air inlets.

* * * * *